US011120283B2

(12) United States Patent
Tokizaki et al.

(10) Patent No.: US 11,120,283 B2
(45) Date of Patent: Sep. 14, 2021

(54) OCCUPANT MONITORING DEVICE FOR VEHICLE AND TRAFFIC SYSTEM

(71) Applicant: SUBARU CORPORATION, Tokyo (JP)

(72) Inventors: Junpei Tokizaki, Tokyo (JP); Ryota Nakamura, Tokyo (JP); Masayuki Marubashi, Tokyo (JP); Keita Onishi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/735,895

(22) Filed: Jan. 7, 2020

(65) Prior Publication Data
US 2020/0285871 A1  Sep. 10, 2020

(30) Foreign Application Priority Data

Mar. 8, 2019  (JP) .............................. JP2019-042455

(51) Int. Cl.
| | |
|---|---|
| *G06K 9/00* | (2006.01) |
| *B60R 11/04* | (2006.01) |
| *H04N 7/18* | (2006.01) |
| *H04N 5/232* | (2006.01) |
| *B60R 21/013* | (2006.01) |

(52) U.S. Cl.
CPC .......... *G06K 9/00845* (2013.01); *B60R 11/04* (2013.01); *B60R 21/013* (2013.01); *H04N 5/23296* (2013.01); *H04N 7/18* (2013.01)

(58) Field of Classification Search
CPC ... G06K 9/00845; B60R 11/04; B60R 21/013; B60R 21/01538; B60R 21/00; B60R 21/0136; B60R 21/01512; H04N 7/18; H04N 5/23296; H04N 7/183
See application file for complete search history.

(56) References Cited

U.S. PATENT DOCUMENTS

| | | |
|---|---|---|
| 2017/0210357 A1 | 7/2017 | Nagai |
| 2017/0240185 A1* | 8/2017 | Li ............................ G08B 7/06 |

FOREIGN PATENT DOCUMENTS

| | | |
|---|---|---|
| JP | 11-43009 A | 2/1999 |
| JP | 2016-038793 A | 3/2016 |

\* cited by examiner

*Primary Examiner* — Nam D Pham
(74) *Attorney, Agent, or Firm* — Troutman Pepper Hamilton Sanders LLP

(57) ABSTRACT

An occupant monitoring device for a vehicle includes an imaging device and a controller. The imaging device is configured to capture an image of an occupant in the vehicle. The controller is configured to perform, on a basis of the image captured by the imaging device, a plurality of determination processes including a behavior detection process of detecting a behavior of the occupant. The controller is further configured to, in a case where collision of the vehicle is predicted or detected, stop one or more of the determination processes other than the behavior detection process and perform the behavior detection process.

18 Claims, 7 Drawing Sheets

| | DMS FUNCTIONS (ALL FUNCTIONS IN NORMAL ACTIVATION) | NORMAL | AFTER COLLISION PREDICTION | AFTER COLLISION DETECTION |
|---|---|---|---|---|
| BASIC | OVERALL CONTROL OF DEVICE | OPERATE | CONTINUE | CONTINUE |
| | IMAGING | OPERATE | CONTINUE | CONTINUE |
| | IMAGE RECORDING | OPERATE | CONTINUE | CONTINUE |
| | IN-VEHICLE COMMUNICATION | OPERATE | CONTINUE | CONTINUE (STOP) |
| | EXTRA-VEHICLE COMMUNICATION | OPERATE | CONTINUE (STOP) | STOP (CONTINUE) |
| SAFETY | DRIVER BEHAVIOR (POSITION OF HEAD, MOTION, ETC.) DETECTION | OPERATE | CONTINUE | STOP |
| | OTHER OCCUPANT BEHAVIOR (POSITION OF HEAD, MOTION, ETC.) DETECTION | OPERATE/ NOT OPERATE | CONTINUE | STOP |
| | LOOKING-ASIDE (LINE OF SIGHT) DETERMINATION FOR DRIVER | OPERATE | STOP | STOP |
| | DOZING OR DROWSINESS DETERMINATION FOR DRIVER | OPERATE | STOP | STOP |
| | DEAD-MAN DETERMINATION FOR DRIVER | OPERATE | STOP | STOP |
| CONVENIENCE | GESTURE DETERMINATION FOR DRIVER | OPERATE | STOP | STOP |
| | EMOTION DETERMINATION FOR DRIVER | OPERATE | STOP | STOP |
| | INDIVIDUAL RECOGNITION (IDENTIFICATION) FOR DRIVER | OPERATE | STOP | STOP |
| | OTHER FUNCTIONS | OPERATE | STOP | STOP |
| | AI UPDATE ENGINE (ACCURACY IMPROVEMENT) | OPERATE | STOP | STOP |

FIG. 4

OCCUPANT MONITORING DEVICE FOR VEHICLE AND TRAFFIC SYSTEM

CROSS-REFERENCE TO RELATED APPLICATIONS

The present application claims priority from Japanese Patent Application No. 2019-042455 filed on Mar. 8, 2019, the entire contents of which are hereby incorporated by reference.

BACKGROUND

The technology relates to an occupant monitoring device for a vehicle and to a traffic system.

Some vehicles already include occupant monitoring devices. Japanese Unexamined Patent Application Publication No. H11-043009 discloses an occupant monitoring device configured to monitor an occupant in a vehicle. The occupant monitoring device reflects information obtained by the monitoring in control of an occupant protection device.

SUMMARY

An aspect of the technology provides an occupant monitoring device for a vehicle. The occupant monitoring device includes an imaging device and a controller. The imaging device is configured to capture an image of an occupant in the vehicle. The controller is configured to perform, on a basis of the image captured by the imaging device, a plurality of determination processes including a behavior detection process of detecting a behavior of the occupant. The controller is further configured to, in a case where collision of the vehicle is predicted or detected, stop one or more of the determination processes other than the behavior detection process and perform the behavior detection process.

An aspect of the technology provides a traffic system including the occupant monitoring device for a vehicle and a communication device. The communication device is located outside the vehicle and configured to communicate with the occupant monitoring device. The communication device is configured to transmit at least a possibility of collision to the occupant monitoring device. The occupant monitoring device is configured to predict or detect the collision of the vehicle, on a basis of the possibility of collision received from the communication device.

An aspect of the technology provides an occupant monitoring device for a vehicle. The occupant monitoring device includes circuitry. The circuitry is configured to acquire imaging information of an occupant in the vehicle. The circuitry is further configured to perform, on a basis of the acquired imaging information, a plurality of determination processes including a behavior detection process of detecting a behavior of the occupant. The circuitry is further configured to, in a case where collision of the vehicle is predicted or detected, stop one or more of the determination processes other than the behavior detection process and perform the behavior detection process.

An aspect of the technology provides an occupant monitoring device for a vehicle. The occupant monitoring device includes an imaging device and a controller. The imaging device is configured to capture an image of an occupant in the vehicle. The controller is configured to perform, on a basis of the image captured by the imaging device, a plurality of determination processes including a behavior detection process of detecting a behavior of the occupant. The controller is further configured to, in a case where collision of the vehicle is predicted or detected, perform the behavior detection process more preferentially than one or more of the determination processes other than the behavior detection process.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 4 is an explanatory diagram illustrating examples of a plurality of functions to be achieved by the occupant monitoring device.

DETAILED DESCRIPTION

Figure 1A:
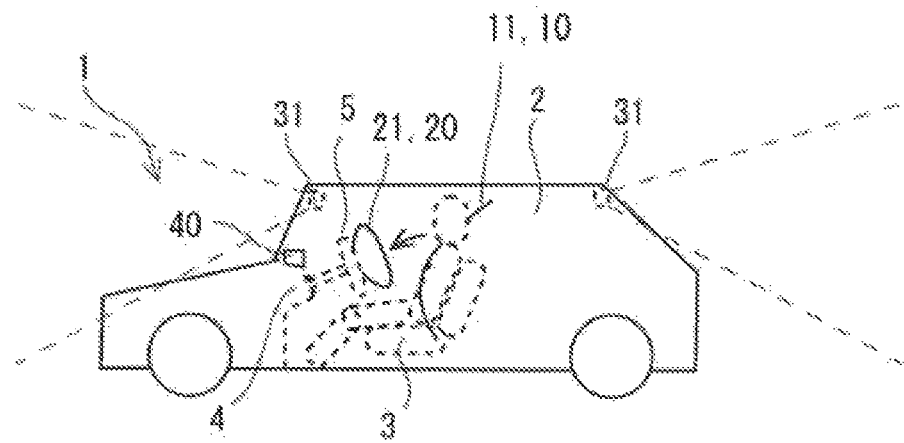
FIGS. 1A to 1C are schematic explanatory diagrams illustrating an automobile that is applicable to a traffic system according to one example embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

First Example Embodiment

Figure 1B:
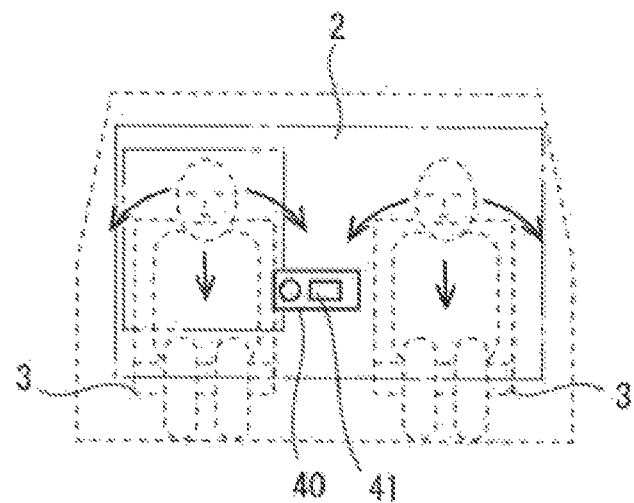
Figure 1C:
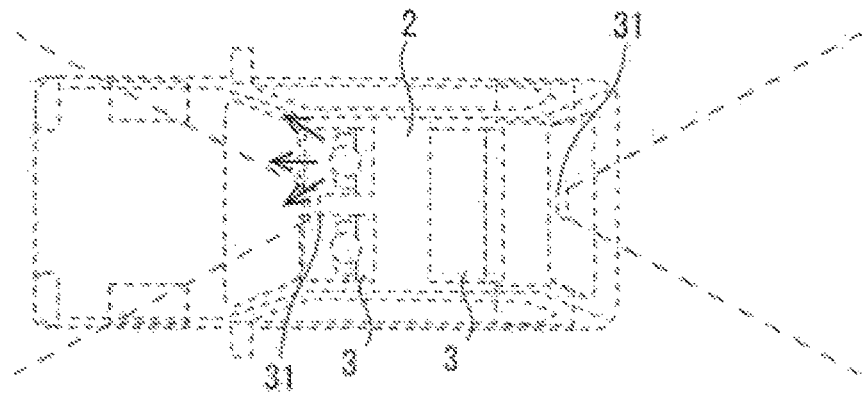

FIGS. 1A to 1C are schematic explanatory diagrams illustrating an automobile 1 that is applicable to a traffic system 80 according to a first example embodiment of the technology.

The automobile 1 in FIGS. 1A to 1C is an example of a vehicle. The automobile 1 may include a cabin 2 that is provided in the middle of a body and allows an occupant to be on board. The cabin 2 may be provided with seats 3 in each of which the occupant may sit. The cabin 2 may be provided with a toe board 4 in a front part. On the front side of the seats 3, a steering wheel 5 may protrude rearward from the toe board 4. It is possible for the occupant to sit in the seat 3 and operate an operating member such as the steering wheel 5.

Figure 2:
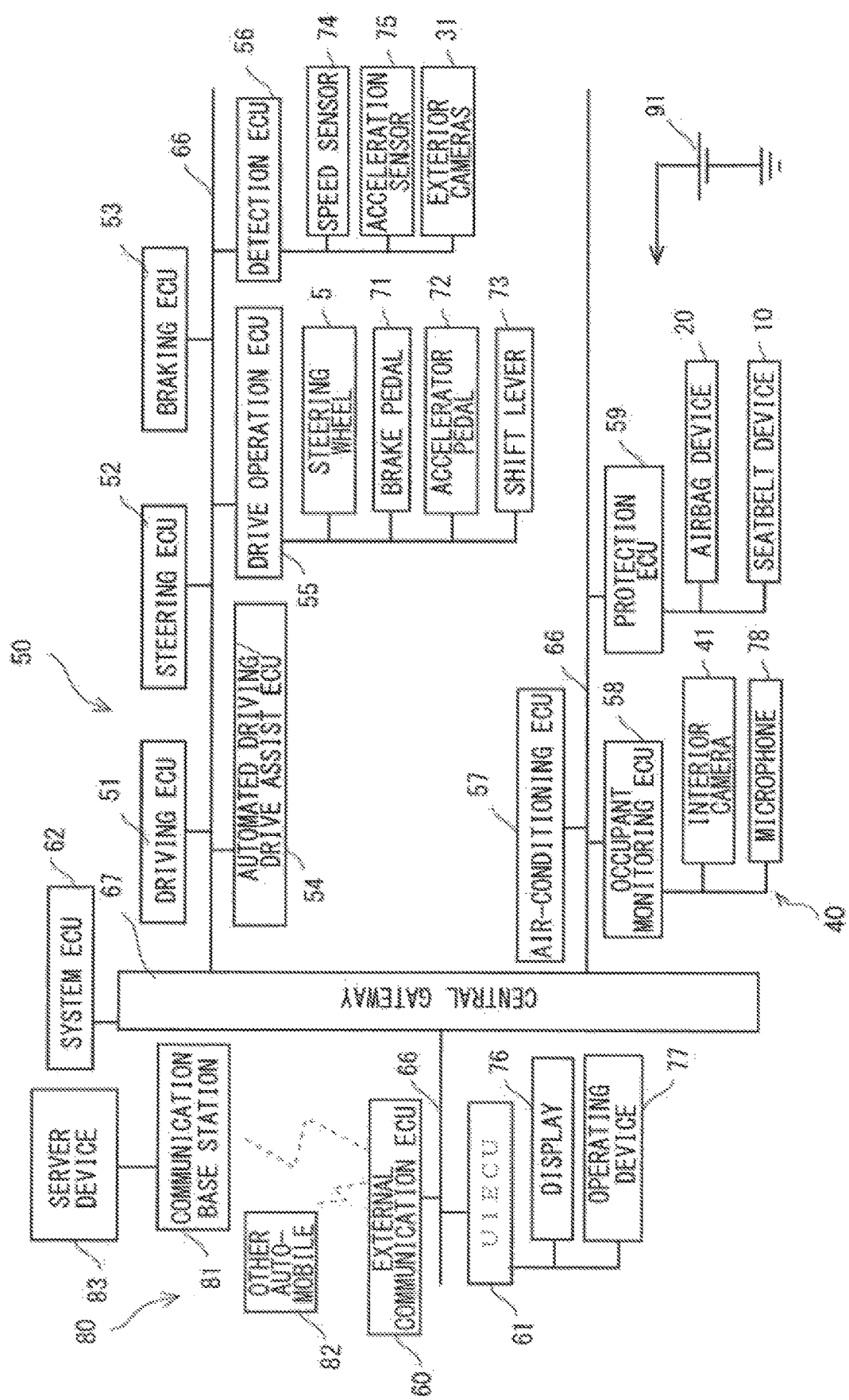
FIG. 2 is a schematic explanatory diagram illustrating a control system of the automobile illustrated in FIGS. 1A to 1C.

FIG. 2 is a schematic explanatory diagram illustrating a control system 50 of the automobile 1 illustrated in FIGS. 1A to 1C. FIG. 2 illustrates an occupant monitoring device 40 and other communication devices of the traffic system 80.

FIG. 2 also illustrates control electronic control units (ECUs) that are included in respective control modules. The control modules represented by the control ECUs may constitute the control system 50 of the automobile 1.

For example, FIG. 2 illustrates a driving ECU 51, a steering ECU 52, a braking ECU 53, an automated driving/drive assist ECU 54, a drive operation ECU 55, a detection ECU 56, an air-conditioning ECU 57, an occupant monitoring ECU 58, a protection ECU 59, an external communication ECU 60, a UIECU 61, and a system ECU 62. These control ECUs may be coupled to a central gateway (CGW) 67 serving as a relay via an in-vehicle network 66 that is adopted in the automobile 1. Examples of the in-vehicle network 66 may include a Controller Area Network (CAN) and a Local Interconnect Network (LIN).

In each control module, the control ECU may be coupled to an electronic apparatus that is used in the automobile 1. Being activated, the control ECU may perform various processes, and control operation of the electronic apparatus coupled to the control ECU, on the basis of information (data) acquired from the in-vehicle network 66. The control ECU may also output, to the in-vehicle network 66, information (data) such as an operation state of the electronic apparatus coupled to the control ECU.

For example, the drive operation ECU 55 may be coupled to operation detection sensors including the steering wheel 5, a brake pedal 71, an accelerator pedal 72, and a shift lever 73. The occupant may operate the operation detection sensors to control traveling of the automobile 1. The drive operation ECU 55 may output control information corresponding to amounts of operation to the in-vehicle network 66. The driving ECU 51, the steering ECU 52, and the braking ECU 53 may acquire information from the in-vehicle network 66, and control traveling of the automobile 1.

The detection ECU 56 may be coupled to elements including a speed sensor 74, an acceleration sensor 75, and exterior cameras 31 of the automobile 1. The acceleration sensor 75 may detect an acceleration due to collision, for example. The detection ECU 56 may output, to the in-vehicle network 66, information such as values of the speed sensor 74 and the acceleration sensor 75 of the automobile 1 and images of the exterior cameras 31. The detection ECU 56 may predict collision on the basis of the images of the exterior cameras 31, and output a prediction result to the in-vehicle network 66. In a case where the acceleration of the acceleration sensor 75 is equal to or greater than a threshold that is higher than an acceleration during normal traveling, the detection ECU 56 may output collision detection to the in-vehicle network 66. For example, after collision with a pedestrian or a bicycle is predicted on the basis of the images of the exterior cameras 31, in a case where the acceleration of the acceleration sensor 75 is equal to or greater than a threshold that is higher than a normal acceleration, the detection ECU 56 may output detection of collision with a pedestrian to the in-vehicle network 66. The central gateway 67 may relay information. The UIECU 61 may acquire information from the in-vehicle network 66, and display the information on a display 76 coupled to the UIECU 61. The UIECU 61 may be coupled to, as well as the display 76, an operating device 77 to be operated by the occupant.

The occupant monitoring ECU 58 may be coupled to an interior camera 41 and a microphone 78. The occupant monitoring ECU 58 may be a control ECU of the occupant monitoring device 40. The occupant monitoring ECU 58 may perform various processes related to the occupant in the automobile 1, depending on information such as the image of the interior camera 41, sound of the microphone 78, and an acceleration of impact, for example, acquired from the in-vehicle network 66. The occupant monitoring ECU 58 may output an image, sound, and other information (data) to the in-vehicle network 66 as necessary.

The protection ECU 59 may be coupled to an airbag device 20 and a seatbelt device 10. The protection ECU 59 may control operation of the airbag device 20 and the seatbelt device 10, on the basis of information acquired from the in-vehicle network 66.

The external communication ECU 60 may wirelessly communicate with, for example, a communication base station 81 and a communication device of another automobile 82 that are present outside the automobile 1. The traffic system 80 may include the communication base station 81, the communication device of the other automobile 82, and a server device 83. The external communication ECU 60 may wirelessly transmit information acquired from the in-vehicle network 66 to the communication base station 81 and the communication device of the other automobile 82. The transmitted information may be used in the server device 83 or the other automobile 82, for example. The external communication ECU 60 may also receive information from the communication base station 81 and the communication device of the other automobile 82, and output the received information to the in-vehicle network 66. This enables the occupant monitoring ECU 58, for example, of the automobile 1 to transmit and receive information (data), via the external communication ECU 60, to/from the server device 83 or the other automobile 82 outside the automobile 1.

The control system 50 illustrated in FIG. 2 may operate by each unit being supplied with electric power from a battery 91 that is provided in the automobile 1. Electric power supply lines from the battery 91 to each unit may run throughout the automobile 1, together with communication cables of the in-vehicle network 66, for example. The control system 50 may be supplied with electric power from an electric power generator and an electric power receiver, in addition to the battery 91.

As described above, the automobile 1 may be provided with, to protect the occupant upon collision, occupant protection devices including the seatbelt device 10 and the airbag device 20.

The seatbelt device 10 may include a seatbelt 11 to be stretched over the occupant who is seated in the seat 3. The seatbelt device 10 may apply tension to the seatbelt 11 upon collision, and restrain the occupant to make it difficult for the occupant to come away from the seat 3.

The airbag device 20 may include an airbag 21 to be deployed on, for example, the front side or the right or left side of the seat 3. The airbag device 20 may deploy the airbag 21 upon collision, and support the occupant to prevent the occupant from falling or coming away from the seat 3.

In this manner, the automobile 1 is able to protect the occupant in the automobile 1 upon collision.

However, the automobile 1 does not only collide in a specific direction such as a front direction. As indicated by arrows in FIGS. 1A to 1C, the automobile 1 can collide also in an oblique direction, for example. Even in a case of such special collision, the occupant protection devices have to be able to protect the occupant in the automobile 1.

Moreover, even if being able to reduce serious injuries of the occupant, the occupant protection devices are not necessarily able to reduce minor injuries as well of the occupant. It is desired that the occupant protection devices reduce injuries upon all kinds of collisions that are assumed for the automobile 1.

In the example embodiment, the exterior cameras 31 may be provided to monitor directions such as the front direction serving as a traveling direction of the automobile 1. Analyzing captured images makes it possible to predict collision beforehand, and to automatically control the automobile 1 on the basis of the prediction.

In the example embodiment, the occupant monitoring device 40 may also be provided to monitor the occupant in the automobile 1. The occupant monitoring device 40 may also be referred to as a driver monitoring system (DMS). The occupant monitoring device 40 may be provided, for example, in the middle of a vehicle width direction at the top of the toe board 4, and may identify the occupant in the automobile 1. Depending on the identified occupant, traveling control of the automobile 1 may be permitted or prohibited.

From images of the interior camera 41 of this occupant monitoring device 40, the occupant monitoring device 40 may determine a position and a behavior of the head, for example, of the occupant upon collision. Depending on the position and the behavior, operation of the occupant protection devices may be controlled. For example, in the example embodiment, the behavior upon collision may be detected not only for a driver, but also for another occupant other than the driver.

In the example embodiment, the occupant monitoring device 40 of the automobile 1 may also determine a posture, for example, of the driver.

As described above, the occupant monitoring device 40 according to the example embodiment may have many functions. To perform these many and various detection functions and determination functions, the occupant monitoring ECU 58 used in the occupant monitoring device 40 is demanded of high throughput. Moreover, simply having high throughput, the occupant monitoring ECU 58 used in the occupant monitoring device 40 can be unable to offer sufficient performance regarding, for example, occupant protection.

For example, while the occupant monitoring ECU 58 is operating to determine, at high speed, the position and the behavior of the occupant upon collision, the operation can be interrupted by a process of another function such as a determination function for the occupant. In such a case, the occupant monitoring ECU 58 can be unable to determine the latest position and behavior of the occupant that are to be determined upon collision. In this case, the occupant protection devices may perform occupant protection depending on not the latest but older position and behavior of the occupant.

It is desired that the occupant monitoring device 40 of the automobile 1 be able to appropriately perform a plurality of determination functions depending on a situation of the automobile 1.

Figure 3:
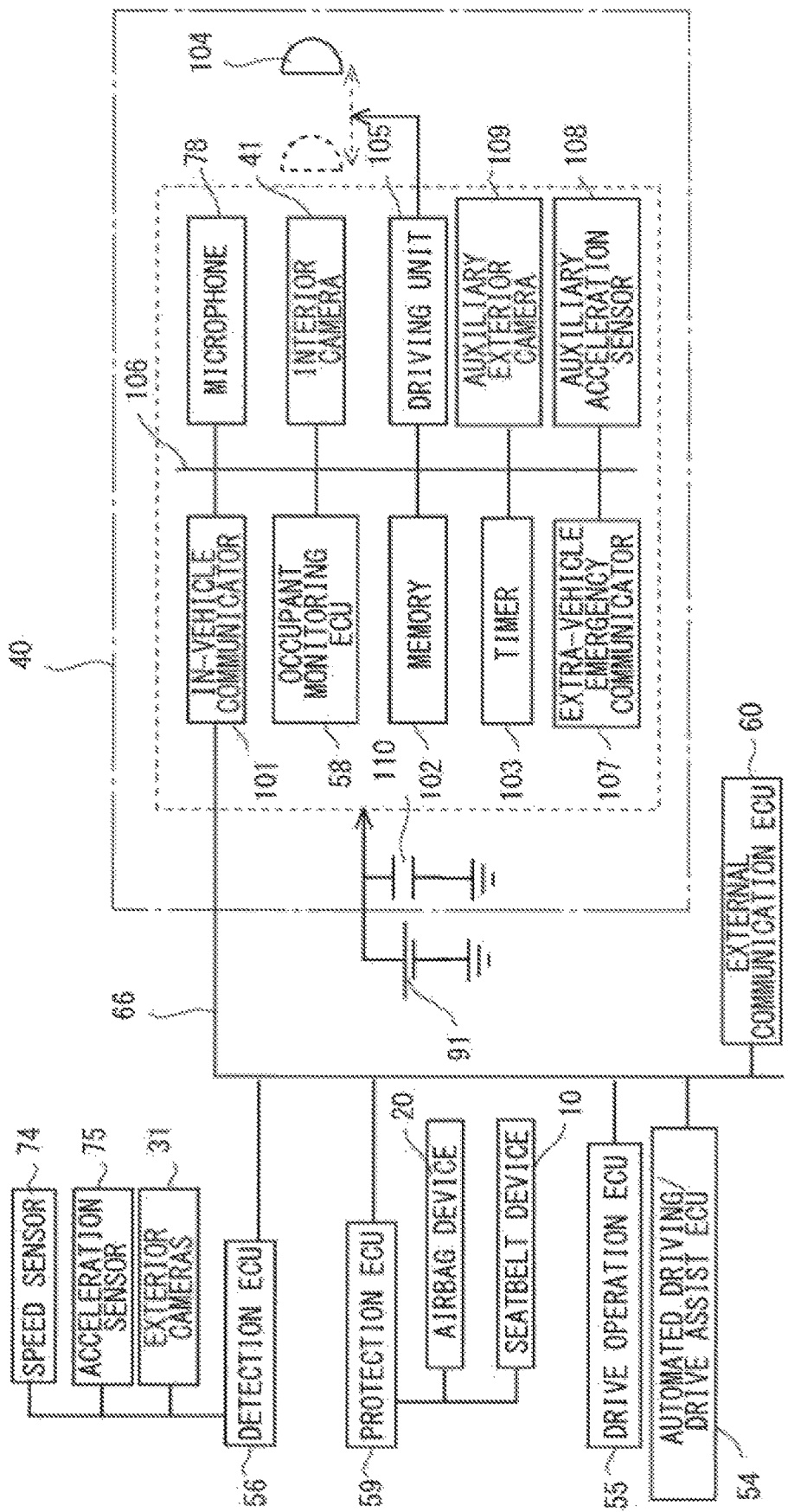
FIG. 3 is a block diagram illustrating an occupant monitoring device that includes an occupant monitoring ECU illustrated in FIG. 2.

FIG. 3 is a block diagram illustrating the occupant monitoring device 40 that includes the occupant monitoring ECU 58 illustrated in FIG. 2.

The occupant monitoring device 40 in FIG. 3 may include an in-vehicle communicator 101, the occupant monitoring ECU 58, a memory 102, a timer 103, the microphone 78, the interior camera 41, a driving unit 105 of a lens 104, and an internal bus 106 that couple these elements. In addition to these elements, the occupant monitoring device 40 may independently include, for example, elements including an extra-vehicle emergency communicator 107, an auxiliary acceleration sensor 108, and an auxiliary exterior camera 109 that are coupled to the internal bus 106. The auxiliary exterior camera 109 may be configured to capture an image of a pedestrian, for example. This enables the occupant monitoring device 40 to independently perform a process upon collision.

Each unit of the occupant monitoring device 40 may be supplied with electric power from the battery 91 of the automobile 1. A path of the electric power supply may be coupled to a storage battery 110 that stores backup electric power. The occupant monitoring device 40 may be provided to be detachable from the automobile 1.

The in-vehicle communicator 101 may be coupled to the in-vehicle network 66. As illustrated in the drawing, for example, the in-vehicle communicator 101 may transmit and receive, via the in-vehicle network 66, information (data) to/from other control ECUs such as the detection ECU 56, the protection ECU 59, and the external communication ECU 60.

The interior camera 41 may be an imaging device that captures an image of the cabin 2 of the automobile 1. The interior camera 41 captures an image of the occupant in the automobile 1.

The driving unit 105 may drive the lens 104, and control a position of the lens 104. Controlling the position of the lens 104 causes an angle of view of the interior camera 41 to change. In one embodiment, the driving unit 105 may serve as a "switcher". If the lens 104 is controlled to a farthest position, the interior camera 41 may capture an image of an upper body including the head of the driver, as indicated by a chain double-dashed line frame in FIG. 1B, for example. The driver may be seated in the seat 3 at a driver seat to operate the steering wheel 5, for example. If the lens 104 is controlled to a nearest position, the interior camera 41 may capture an image of the whole of the cabin 2, as indicated by a chain line frame in FIG. 1B, for example. In this case, it is possible for the interior camera 41 to capture an image of, in addition to the driver, another occupant (i.e., a passenger) who is seated in the seat 3 at a passenger seat or rear seats.

The microphone 78 may convert sound of the cabin 2 of the automobile 1 into an electrical signal.

The timer 103 may measure elapsed time or a time.

The extra-vehicle emergency communicator 107 may be a communication device that is able to communicate with the communication base station 81 or the other automobile 82 outside the automobile 1 in, for example, an emergency such as an accident. The extra-vehicle emergency communicator 107 may communicate with the communication base station 81 or the other automobile 82 by the same communication method as that used by the external communication ECU 60.

Like the acceleration sensor 75, the auxiliary acceleration sensor 108 may detect an acceleration that acts on the automobile 1.

The memory 102 may record various information, such as images and detection values, acquired by the occupant monitoring device 40. The memory 102 may also record a program for occupant monitoring.

The occupant monitoring ECU 58 may read the program for occupant monitoring from the memory 102 and perform the program. Thus, the occupant monitoring ECU 58 may serve as a controller of the occupant monitoring device 40. The controller of the occupant monitoring device 40 may control overall operation of the occupant monitoring device 40, enabling the occupant monitoring device 40 to achieve occupant monitoring.

FIG. 4 is an explanatory diagram illustrating examples of a plurality of functions to be achieved by the occupant monitoring device 40.

The plurality of functions to be achieved by the occupant monitoring device 40 in FIG. 4 may be classified into basic functions as the occupant monitoring device 40, safety functions of determining safety of the occupant, and convenience functions of improving convenience of the occupant.

The basic functions may include, for example, an imaging function performed by the interior camera 41, a function of recording images on the memory 102, an in-vehicle communication function performed by the in-vehicle communicator 101, and an extra-vehicle communication function performed by communication of the in-vehicle communicator 101 and the external communication ECU 60. The imaging function may be achieved by the interior camera 41 and the auxiliary exterior camera 109. The extra-vehicle communication function may be achieved by the extra-vehicle emergency communicator 107.

The safety functions may include, for example, a driver behavior detection function, an other occupant behavior detection function, a looking-aside (line of sight) determination function, a dozing or drowsiness determination function, and a dead-man determination function. The driver behavior detection function may detect a behavior of the driver on the basis of a captured image including the driver. The other occupant behavior detection function may detect a behavior of another occupant other than the driver on the basis of a captured image of the other occupant. The looking-aside determination function may determine whether the driver is looking aside on the basis of a captured image including the driver. The dozing or drowsiness determination function may determine dozing or drowsiness of the driver on the basis of a captured image including the driver. The dead-man determination function may determine dead or alive of the driver on the basis of a captured image including the driver.

The convenience functions may include, for example, a gesture determination function, an emotion determination function, an individual recognition function, and another determination function. The gesture determination function may determine a gesture of the driver on the basis of a captured image including the driver. The emotion determination function may determine an emotion of the driver on the basis of a captured image including the driver. The individual recognition function may individually recognize the driver on the basis of a captured image including the driver. The other determination function may perform another determination on the basis of a captured image including the driver. The convenience functions may also include an update function of updating an AI determination engine to be used in an AI determination process in each of the functions described above.

The occupant monitoring ECU 58 controls whether to perform or stop these functions (processes) depending on a situation of the automobile 1. FIG. 4 lists a normal activation state, a state after collision prediction, and a state after collision detection. The normal activation state indicates a situation in which the automobile 1 operates normally and is able to travel. The state after collision prediction indicates a situation in which collision of the automobile 1 has been predicted. The state after collision detection indicates a situation in which actual collision of the automobile 1 has been detected.

In a case of the normal activation state, the occupant monitoring ECU 58 may perform all the functions in FIG. 4 for the occupant monitoring device 40. It is to be noted that the occupant monitoring ECU 58 may perform the other occupant behavior detection function only in a case where the lens 104 is wide-angle. The occupant monitoring ECU 58 is able to perform a plurality of determination processes.

In a case of the state after collision prediction, the occupant monitoring ECU 58 may perform only some of the functions of the occupant monitoring device 40, and stop the other functions. For example, the occupant monitoring ECU 58 may stop all of the convenience functions. The occupant monitoring ECU 58 may also stop, for the safety functions, the looking-aside (line of sight) determination function, the dozing or drowsiness determination function, and the dead-man determination function. The occupant monitoring ECU 58 may perform the other functions, i.e., the basic functions, the driver behavior detection function, and the other occupant behavior detection function. It is to be noted that the occupant monitoring ECU 58 may stop, for the basic functions, the extra-vehicle communication function.

In a case of the state after collision detection, the occupant monitoring ECU 58 may perform only minimum functions that are less than those in the state after collision prediction, and stop the other functions. For example, the occupant monitoring ECU 58 may stop all of the convenience functions and all of the safety functions. The occupant monitoring ECU 58 may also stop, for the basic functions, the extra-vehicle communication function. The occupant monitoring ECU 58 may perform the other functions, i.e., the imaging function, the image recording function, and the in-vehicle communication function. It is to be noted that the occupant monitoring ECU 58, may perform the extra-vehicle communication function, in place of the in-vehicle communication function or together with the in-vehicle communication function. The stopped functions no longer consume the throughput of the occupant monitoring ECU 58. It is also possible to inhibit electric power consumption of the occupant monitoring ECU 58.

In the example embodiment, in a case of the state after collision prediction, only some of the functions of the occupant monitoring device 40 may be performed, and the other functions may be stopped. However, the other functions do not necessarily have to be stopped. For example, in a case of the state after collision prediction, the driver behavior detection function and the other occupant behavior detection function among the safety functions may be performed in a predetermined cycle, whereas interruption by the other functions may be prohibited. Examples of the other functions may include the looking-aside (line of sight) determination function, the dozing or drowsiness determination function, and the dead-man determination function. This enables the driver behavior detection function and the other occupant behavior detection function to be performed in a predetermined or desired cycle without being interrupted by the other functions.

Figure 5:
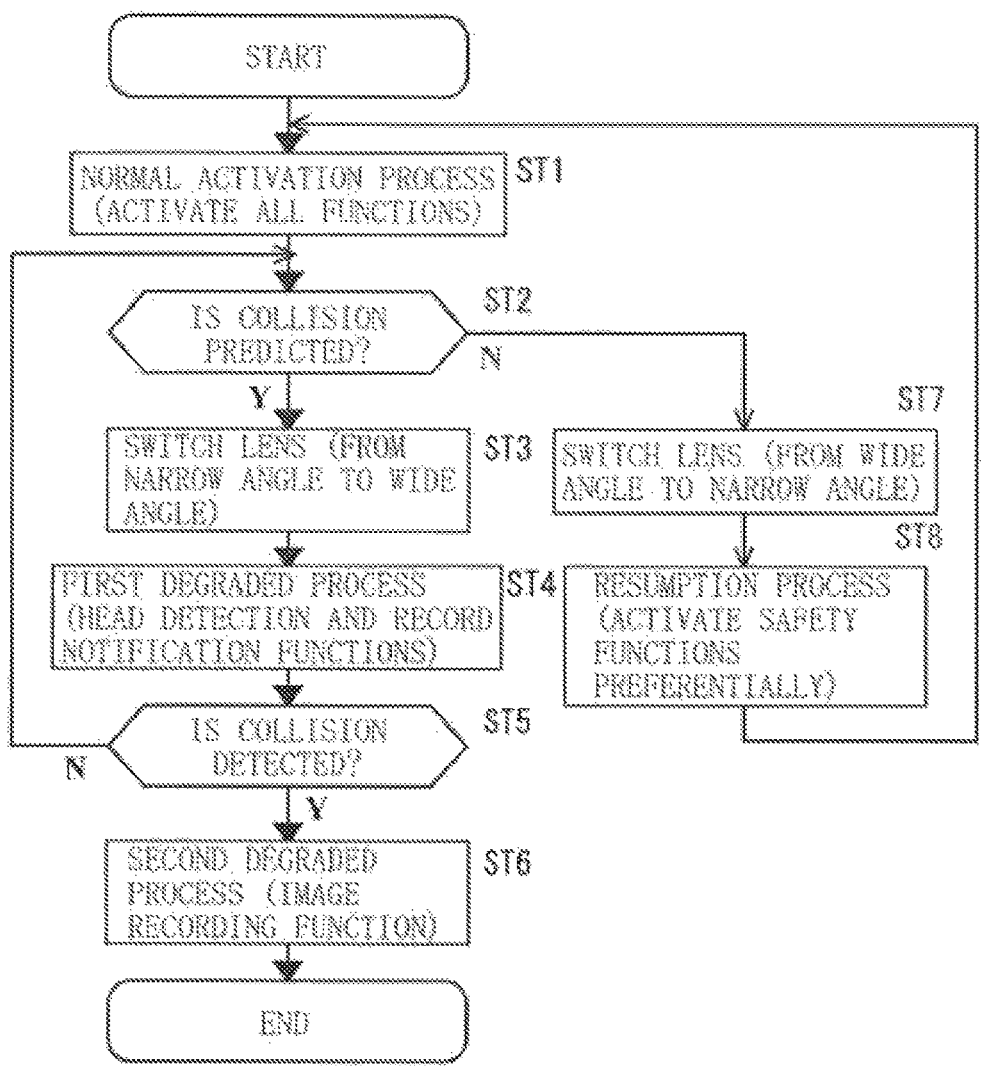
FIG. 5 is a flowchart illustrating a process of activating the plurality of functions by the occupant monitoring ECU illustrated in FIG. 3.

FIG. 5 is a flowchart illustrating a process of activating the plurality of functions by the occupant monitoring ECU 58 illustrated in FIG. 3.

When the occupant monitoring device 40 is activated together with the automobile 1, the occupant monitoring ECU 58 may perform the activation process in FIG. 5. It is to be noted that, even while the automobile 1 is at a stop, the occupant monitoring ECU 58 may perform the activation process in FIG. 5 upon unlocking of a door key, for example.

In step ST1, the occupant monitoring ECU 58 may activate, for the occupant monitoring device 40, all the functions listed for the normal activation state in FIG. 4. For example, the interior camera 41 provided in the occupant monitoring device 40 may capture a still image of the driver, and the occupant monitoring device 40 may perform the individual recognition process of specifying the driver on the basis of the image. In a case where the driver is authenticated as a driver who has been registered in the automobile 1 in advance, the in-vehicle communicator 101 of the occupant monitoring ECU 58 may output a result of successful authentication to the in-vehicle network 66. For example, the drive operation ECU 55 may permit operation of the steering wheel 5, for example, on the basis of the result of successful authentication. This enables the automobile 1 to travel. When the driver leaves the automobile 1, the occupant monitoring ECU 58 may output, to the in-vehicle network 66, a result of unsuccessful authentication indicating no authenticated driver. The drive operation ECU 55 may prohibit operation of the steering wheel 5, for example, on the basis of the result of unsuccessful authentication. This makes the automobile 1 unable to travel.

In step ST2, the occupant monitoring ECU 58 may determine whether collision is predicted. For example, the occupant monitoring ECU 58 may acquire, from the in-vehicle communicator 101, collision prediction that has been outputted to the in-vehicle network 66 by the detection ECU 56, and determine whether collision is predicted. In another example, the external communication ECU 60 may receive the possibility of collision for the automobile 1 or the other automobile 82 preceding the automobile 1 from the other automobile 82 or the communication base station 81, for example, and output information of collision ahead to the in-vehicle network 66. In that case, the occupant monitoring ECU 58 may acquire the information of collision ahead, and determine whether collision is predicted. In a case where no collision is predicted ("N" in step ST2), the occupant monitoring ECU 58 may advance the process to step ST7. In a case where collision is predicted ("Y" in step ST2), the occupant monitoring ECU 58 may advance the process to step ST3.

In step ST3 after the collision is predicted, the occupant monitoring ECU 58 may instruct the driving unit 105 to switch an angle of view to switch the angle of view from narrow-angle to wide-angle. The interior camera 41 may be switched from a state of capturing an image of only the driver to a state of capturing an image of the whole of the cabin 2. Because the automobile 1 is in the normal activation state, the occupant monitoring ECU 58 may perform, on the basis of the captured image, the driver behavior detection process and the other occupant behavior detection process.

In step ST4, the occupant monitoring ECU 58 may set an operation state of the occupant monitoring device 40 to a first degraded state after collision prediction. In the first degraded state, the occupant monitoring ECU 58 may perform only the functions assigned with "continue" in the state after collision prediction in FIG. 4, and stop the determination processes (functions) other than the behavior detection processes, i.e., the functions assigned with "stop". This causes the occupant monitoring ECU 58 to perform the driver behavior detection function and the other occupant behavior detection function, without being hindered by interruption caused by the other determination processes, for example. It is possible for the occupant monitoring ECU 58 to repeatedly perform the driver behavior detection function and the other occupant behavior detection function at high speed in a short, stable cycle. Consequently, the occupant monitoring ECU 58 is able to detect the current position and behavior of a plurality of occupants including the driver, on the basis of the latest wide-angle image captured by the interior camera 41. The occupant monitoring ECU 58 is able to output, to the in-vehicle network 66, the latest determination result for the position and the behavior of the plurality of occupants including the driver. It is possible for the protection ECU 59 to prepare for operation of the airbag device 20 and the seatbelt device 10, on the basis of the latest determination result for the position and the behavior of the plurality of occupants including the driver.

In step ST5, the occupant monitoring ECU 58 may acquire an acceleration that acts on the automobile 1 due to collision, and detect collision. For example, the occupant monitoring ECU 58 may acquire, from the in-vehicle communicator 101, collision detection that has been outputted to the in-vehicle network 66 by the detection ECU 56, and detect collision. In a case where the acceleration of the auxiliary acceleration sensor 108 is equal to or greater than a collision presence/absence threshold that is higher than an acceleration during normal traveling, the occupant monitoring ECU 58 may determine that collision is detected. In a case where no collision is detected ("N" in step ST5), the occupant monitoring ECU 58 may return the process to step ST2. In a case where collision is detected ("Y" in step ST5), the occupant monitoring ECU 58 may advance the process to step ST6.

In step ST6, the occupant monitoring ECU 58 may set the operation state of the occupant monitoring device 40 to a second degraded state after collision detection. In the second degraded state, the occupant monitoring ECU 58 may perform only the functions assigned with "continue" in the state after collision detection in FIG. 4, and stop the functions assigned with "stop". This causes the occupant monitoring ECU 58 to perform only the process of recording, on the memory 102, an image of the plurality of occupants captured by the interior camera 41, without being hindered by interruption caused by the other determination processes, for example. By performing only the process of repeatedly recording the captured image of the plurality of occupants on the memory 102, the occupant monitoring ECU 58 is able to operate with minimum necessary electric power consumption.

In a case where no collision is predicted in step ST2, the occupant monitoring ECU 58 may advance the process to step ST7. The occupant monitoring ECU 58 may perform a process of recovering to a normal state.

In step ST7, the occupant monitoring ECU 58 may instruct the driving unit 105 to switch an angle of view to switch the angle of view from wide-angle to narrow-angle. The interior camera 41 may be switched from a state of capturing an image of the whole of the cabin 2 to a state of capturing an image of only the driver.

In step ST8, the occupant monitoring ECU 58 may perform a resumption process of returning the operation state of the occupant monitoring device 40 from the first degraded state after collision prediction to the normal activation state. The occupant monitoring ECU 58 may activate the determination processes (functions) other than the behavior detection processes, i.e., the functions that have been stopped, to activate all the functions listed for the normal activation state in FIG. 4. At this occasion, for the convenience functions and the safety functions in FIG. 4, the occupant monitoring ECU 58 may activate the determination processes of the safety functions earlier, i.e., more preferentially, than the determination processes of the convenience functions.

Here, the update function performed by an AI of the occupant monitoring device 40 will be described.

Figure 6:
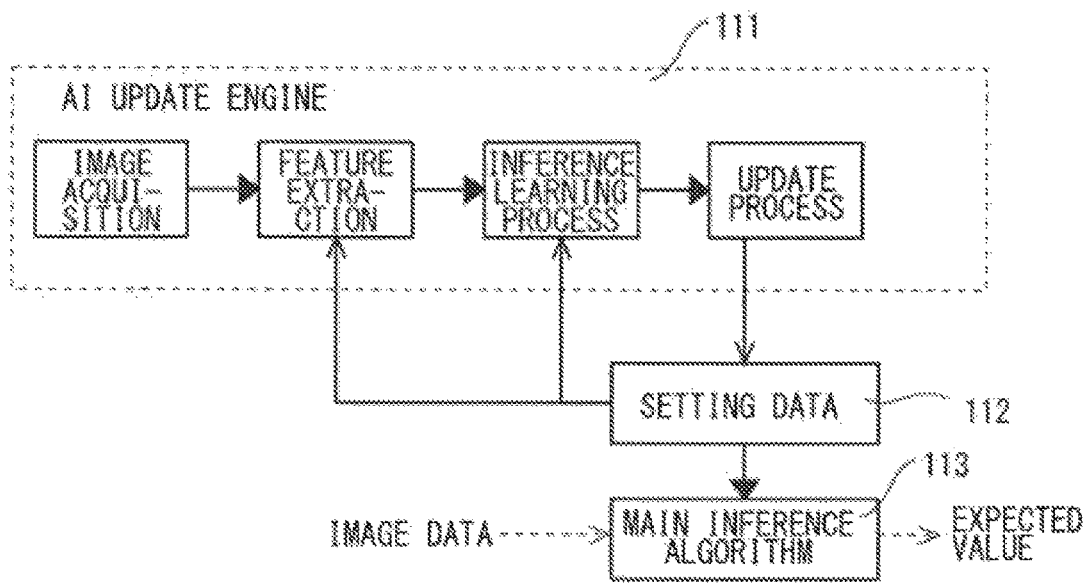
FIG. 6 is an explanatory diagram illustrating an example of an AI function to be performed by the occupant monitoring ECU.

FIG. 6 is an explanatory diagram illustrating an example of an AI function to be performed by the occupant monitoring ECU 58. The occupant monitoring ECU 58 may be configured to perform the AI function in FIG. 6 for each of the functions in FIG. 4.

The AI function in FIG. 6 may include an AI update engine 111, setting data 112, and a main inference algorithm 113.

The setting data 112 may be various parameters, for example.

The main inference algorithm 113 may be a program that performs, by using the setting data 112, processes of the functions of the occupant monitoring device 40 or processes of some of the functions. For example, the main inference algorithm 113 may generate an expected value for a feature to be determined, on the basis of image data. In this case, the functions in FIG. 4 may perform each determination process for an image portion where the highest expected value is obtainable on the basis of the main inference algorithm 113.

The AI update engine 111 may be a program that updates the setting data 112 and/or the main inference algorithm 113, on the basis of learning data.

For example, the AI update engine 111 may acquire image data serving as learning data, extract features of the image data, perform an inference learning process based on the features, and update the setting data 112 and/or the main inference algorithm 113 with a result of the inference learning process. This causes the setting data 112 and/or the main inference algorithm 113 to be updated.

Figure 7:
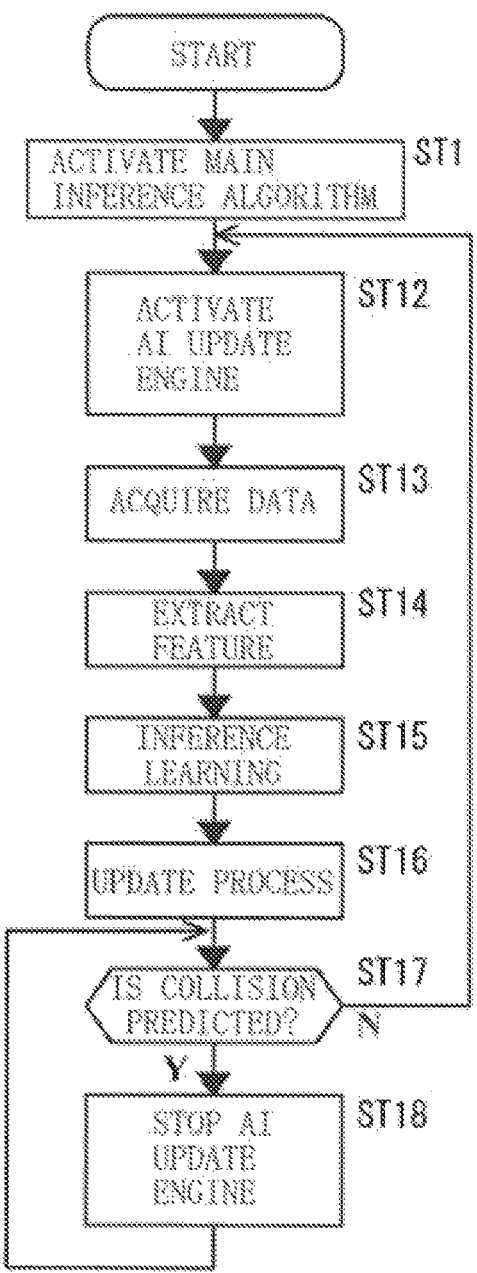
FIG. 7 is a flowchart for the AI function and illustrates a flow of an activation process corresponding to FIG. 5.

FIG. 7 is a flowchart for the AI function and illustrates a flow of an activation process corresponding to FIG. 5.

In step ST11, the occupant monitoring ECU 58 may activate the main inference algorithm 113.

In step ST12, the occupant monitoring ECU 58 may activate the AI update engine 111.

In step ST13, the occupant monitoring ECU 58 serving as the AI update engine 111 may acquire image data serving as learning data. The image data may be an image captured by the interior camera 41.

In step ST14, the occupant monitoring ECU 58 serving as the AI update engine 111 may extract features included in the image data.

In step ST15, the occupant monitoring ECU 58 serving as the AI update engine 111 may perform the inference learning process, on the basis of the extracted features and the image data.

In step ST16, the occupant monitoring ECU 58 serving as the AI update engine 11*l* may update the setting data 112 and/or the main inference algorithm 113 with a result of the inference learning process. This causes the setting data 112 and/or the main inference algorithm 113 to be updated.

In step ST17, the occupant monitoring ECU 58 may determine whether collision is predicted. Step ST17 may be the same as step ST2 in FIG. 5. In a case where no collision is predicted ("N" in step ST17), the occupant monitoring ECU 58 may return the process to step ST12. The occupant monitoring ECU 58 may repeat the processes described above, and keep updating the setting data 112 and/or the main inference algorithm 113. In a case where collision is predicted ("Y" in step ST17), the occupant monitoring ECU 58 may advance the process to step ST18.

In step ST18, the occupant monitoring ECU 58 may stop the AI update engine 111.

Thereafter, the occupant monitoring ECU 58 may return the process to step ST17. During a period in which collision is predicted, the occupant monitoring ECU 58 may keep stopping the AI update engine 111. During the period in which the collision is predicted, the occupant monitoring ECU 58 may refrain from performing the process of the AI update engine 111. It is possible for the occupant monitoring ECU 58 to stop the update function, as well as the determination processes other than the behavior detection processes, and repeatedly perform the behavior detection processes.

As described above, more functions are demanded of an occupant monitoring device for a vehicle. It is desired that the occupant monitoring device be able to not only perform determination functions for normal traveling, but also detect a behavior of an occupant upon collision. It is also desired that the occupant monitoring device be able to detect the behavior upon collision not only for a driver, but also for another occupant other than the driver (e.g., a passenger seated in the passenger seat). To perform these many and various detection functions and determination functions, an ECU serving as a controller of the occupant monitoring device is demanded of high throughput.

However, the ECU simply having high throughput can be insufficient. It is not always possible to obtain sufficient occupant protection performance as the occupant monitoring device. For example, while the ECU is operating to detect, at high speed, the position and the behavior of the occupant upon collision, the operation can be interrupted by a process of another function such as a determination function for the occupant. In such a case, the detection of the position and the behavior is interrupted by the other function, and the ECU can be unable to update the position and the behavior of the occupant with latest information. In this case, the occupant protection devices may perform occupant protection depending on not the latest but older position and behavior of the occupant. It is desired that the occupant monitoring device for the vehicle be able to appropriately perform a plurality of determination functions depending on a situation.

In view of such circumstances, in the example embodiment, the occupant monitoring ECU 58 is configured to perform, on the basis of an image captured by the interior camera 41, a plurality of determination processes including a behavior detection process of detecting a behavior of an occupant (e.g., a driver) in the automobile 1. In a case where collision of the automobile 1 is predicted or detected, the occupant monitoring ECU 58 stops the determination processes other than the behavior detection process, and repeatedly performs the behavior detection process. Thus, after the collision of the automobile 1 is predicted or detected, the occupant monitoring ECU 58 of the occupant monitoring device 40 is able to update behavior detection information of the occupant for each very short period, without being interfered with interruption caused by another function. This offers immediacy of the behavior detection information of the occupant. This makes it possible to detect the behavior of the occupant upon the collision with an accuracy high enough for suitable application to occupant protection, and improve occupant protection performance.

For example, in the example embodiment, in a case where the collision of the automobile 1 is predicted or detected, the driving unit 105 may switch an image capturing state from a state of capturing an image of the driver to a state of capturing an image including another occupant (e.g., a passenger seated in the passenger seat) as well as the driver. This enables the occupant monitoring ECU 58 to, in a case where the collision of the automobile 1 is predicted or detected, perform the behavior detection process not only for the driver but also for the other occupant, and detect, for a plurality of occupants including the driver in the automobile 1, the behavior of each occupant upon the collision with high accuracy. Even in performing the behavior detection process for the other occupant other than the driver, the occupant monitoring ECU 58 is able to update the behavior detection information of each occupant for each very short period, because the determination processes other than the behavior detection process are stopped. This makes it possible to detect the behavior of each occupant upon the collision with an accuracy high enough for suitable application to occupant protection.

In the example embodiment, in a case where the collision of the automobile 1 is detected, the occupant monitoring ECU 58 may stop the determination processes including the behavior detection process, and repeatedly record the image captured by the interior camera 41 on the memory 102. In other words, after the collision detection, the occupant monitoring device 40 may perform only the process of repeatedly recording the image of the cabin 2 on the memory 102. This enables the occupant monitoring device 40 to record and accumulate states after the collision for the plurality of occupants in the automobile 1. This makes it possible to reduce electric power consumed by operation of the occupant monitoring ECU 58, and effectively use electric power remaining in the automobile 1 to record and accumulate the states after the collision for the plurality of occupants in the automobile 1.

In the example embodiment, in some cases, no collision is detected after the collision of the automobile 1 is predicted. For example, in some cases, after the collision is predicted, the prediction of the collision is resolved before the collision is actually detected. In such a case, the occupant monitoring ECU 58 may resume determination processes of the safety functions, such as the looking-aside determination, the dozing determination, the drowsiness determination, and the dead-man determination for the driver, more preferentially than determination processes of the convenience functions, such as the gesture determination, the emotion determination, and the individual identification. This enables the occupant monitoring device 40 to perform the looking-aside determination, the dozing determination, the drowsiness determination, and the dead-man determination for the driver from immediately after resumption of determination processes.

In the example embodiment, in a case where the collision of the automobile 1 is predicted or detected, the occupant monitoring ECU 58 may stop the update function of updating the determination processes, as well as the determination processes other than the behavior detection process. This makes it possible to perform determination, such as the behavior detection, the gesture determination, the emotion determination, the looking-aside determination, the dozing determination, the drowsiness determination, and the dead-man determination, by the determination processes updated until immediately before the collision. It is possible to suitably perform these determinations by the determination processes that may be updated to suit the occupant after the occupant goes on board.

Second Example Embodiment

Now, the traffic system 80 according to a second example embodiment of the technology will be described. The following description mainly describes differences from the first example embodiment described above. In the second example embodiment, elements that are similar to those in the first example embodiment described above are denoted with the same numerals to avoid any redundant description.

Figure 8:
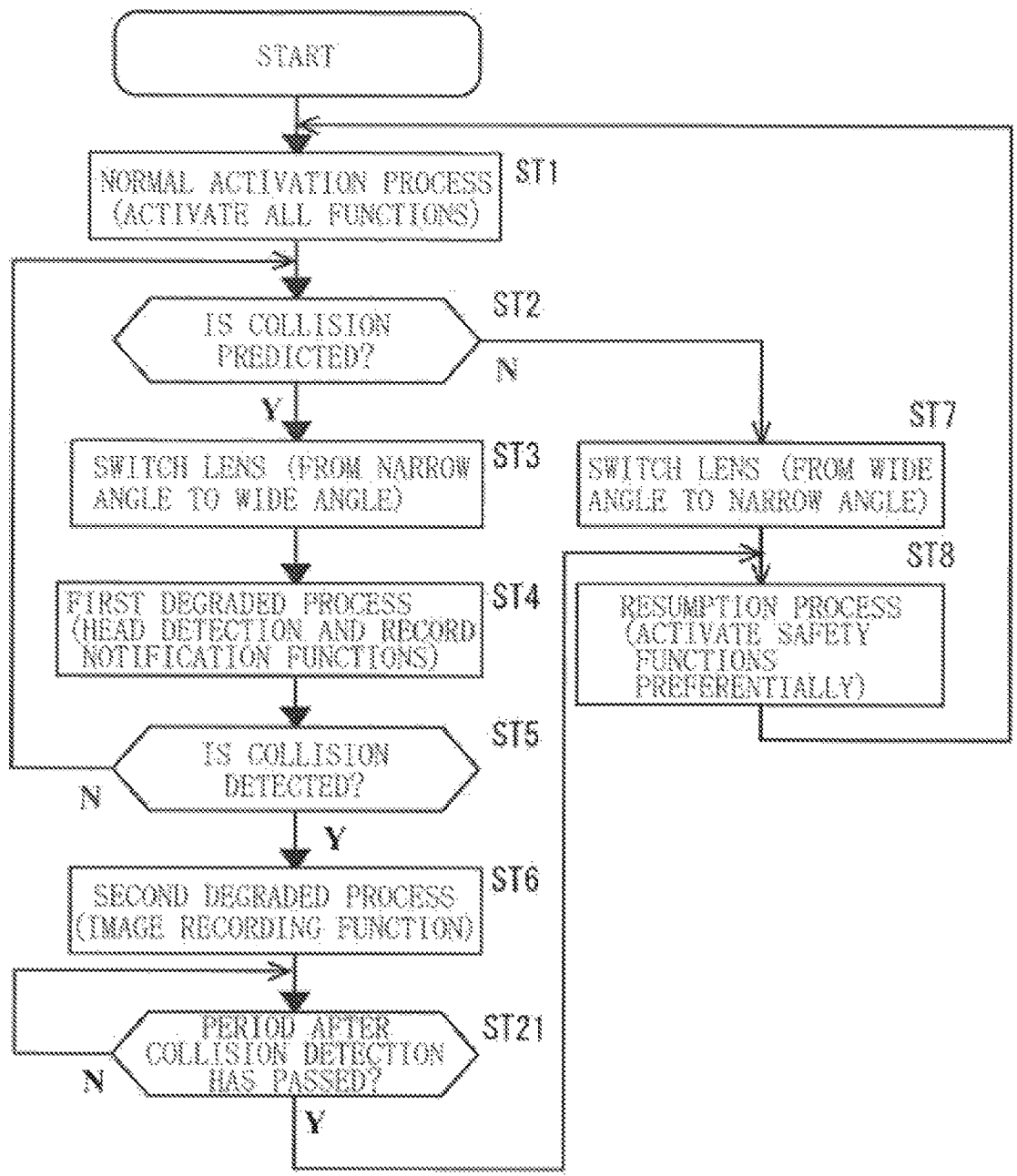
FIG. 8 is a flowchart illustrating a process of activating a plurality of functions by an occupant monitoring ECU in a traffic system according to one example embodiment of the technology.

FIG. 8 is a flowchart illustrating a process of activating a plurality of functions by the occupant monitoring ECU 58 in the traffic system 80 according to the second example embodiment of the technology.

When the occupant monitoring device 40 is activated together with the automobile 1, the occupant monitoring ECU 58 may perform the activation process in FIG. 8. It is to be noted that, even while the automobile 1 is at a stop, the occupant monitoring ECU 58 may perform the activation process in FIG. 8 upon unlocking of a door key, for example.

If collision is detected in step ST5 ("Y" in step ST5), in step ST6, the occupant monitoring ECU 58 may set the operation state of the occupant monitoring device 40 to the second degraded state after collision detection.

Thereafter, in step ST21, the occupant monitoring ECU 58 may determine whether a predetermined period after collision detection has been measured by the timer 103. In a case where the period after collision detection has not been measured ("N" in step ST21), the occupant monitoring ECU 58 may repeat the process in step ST21. This enables the occupant monitoring ECU 58 to, in the period after collision detection, record and accumulate, on the memory 102, the image of the plurality of occupants captured by the interior camera 41. If the period after collision detection has been measured ("Y" in step ST21), the occupant monitoring ECU 58 may advance the process to step ST8.

In step ST8, the occupant monitoring ECU 58 may perform a resumption process of returning the operation state of the occupant monitoring device 40 from the second degraded state after collision detection to the normal activation state. The occupant monitoring ECU 58 may activate the determination processes (functions) other than the behavior detection processes, i.e., the functions that have been stopped, to activate all the functions listed for the normal activation state in FIG. 4. At this occasion, for the convenience functions and the safety functions in FIG. 4, the occupant monitoring ECU 58 may activate the determination processes of the safety functions earlier, i.e., more preferentially, than the determination processes of the convenience functions.

The occupant monitoring ECU 58 may also record, on the memory 102, various determination results that have been determined on the basis of the image of the plurality of occupants captured by the interior camera 41. Thus, on the memory 102 may be recorded, together with the image of the occupants after the collision, determination results determined by the occupant monitoring device 40 for the functions in FIG. 4.

Thereafter, the occupant monitoring ECU 58 may output, from the in-vehicle communicator 101 to the in-vehicle network 66, images and determination results that have been recorded on the memory 102 after the collision to be accumulated. The external communication ECU 60 may acquire information such as the image after the collision from the in-vehicle network 66, and transmit the information to the traffic system 80. The occupant monitoring ECU 58 may transmit the images and determination results of the memory 102 from the extra-vehicle emergency communicator 107 to the traffic system 80. By receiving the images and the determination results from the in-vehicle communicator 101, it is possible for the server device 83 and the other automobile 82 of the traffic system 80 to grasp, in detail, a state of the automobile 1 after the collision. The server device 83 and the other automobile 82 may serve as the other communication devices that communicate with the external communication ECU 60 in the traffic system 80. It is possible for the server device 83 and the other automobile 82 to acquire the images and the determination results as an emergency report.

As described above, in the example embodiment, the occupant monitoring ECU may resume the determination processes other than the behavior detection process, when a predetermined period passes after the collision of the automobile 1 is detected. This enables the occupant monitoring device 40 to perform, for example, the gesture determination, the emotion determination, the looking-aside determination, the dozing determination, the drowsiness determination, and the dead-man determination for the occupant after the collision, and record results of the determinations on the memory 102.

In the example embodiment, when the collision is predicted, only determination processes may be stopped, without stopping the basic operation of the system. Consequently, in the example embodiment, it is possible to not only share data among the determination functions, but also improve detection accuracy of the behavior of the occupant after the collision prediction.

In the example embodiment, because only determination processes may be stopped, it is possible for the memory 102 after the stop to keep setting of information of the occupant and calibrations and determination values for the functions, for example, before the stop of the determination functions. In this case, if the prediction of the collision is resolved and determination is to be resumed, it is only necessary to enable the determination functions that have been stopped. It is possible for the resumed functions to resume appropriate operation from immediately after the resumption, by using the setting before the stop.

In the example embodiment, when the collision is predicted, the plurality of determination functions may be stopped. This makes it possible to keep resources directed to processing a wide-range image including the occupant other than the driver, after the collision prediction. It is possible to process the wide-range image including the occupant other than the driver by using a recording region that is released after the stop, without additionally providing the memory 102.

Although some example embodiments of the technology have been described in the foregoing, the technology is by no means limited to the example embodiments. Various changes and modifications may be made to any embodiment without departing from the scope of the technology.

The occupant monitoring device 40 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the occupant monitoring device 40. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the occupant monitoring device 40 illustrated in FIG. 3.

Although the technology is described hereinabove in terms of example embodiments, it is not limited thereto. It should be appreciated that variations may be made in the described example embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this technology, the use of the terms first, second, etc. do not denote any order or importance, but rather the terms first, second, etc. are used to distinguish one element from another. The term "disposed on/provided on/formed on" and its variants as used herein refer to elements disposed directly in contact with each other or indirectly by having intervening structures therebetween. Moreover, no element or component in this technology is intended to be dedicated to the public regardless of whether the element or component is explicitly recited in the following claims.

The invention claimed is:

1. An occupant monitoring device for a vehicle, the occupant monitoring device comprising:
an imaging device configured to capture an image of an occupant in the vehicle; and
a controller configured to perform, on a basis of the image captured by the imaging device, a plurality of determination processes including a behavior detection process of detecting a behavior of the occupant, and configured to, in a case where collision of the vehicle is predicted or detected, stop one or more of the determination processes other than the behavior detection process and perform the behavior detection process.

2. The occupant monitoring device for a vehicle, according to claim 1, wherein
the occupant comprises a plurality of occupants including a driver, and
the behavior detection process detects a behavior of at least the driver out of the plurality of occupants.

3. The occupant monitoring device for a vehicle, according to claim 2, the occupant monitoring device further comprising a switcher configured to switch an angle of view of the imaging device between a first angle of view and a second angle of view that is wider than the first angle of view, the first angle of view being directed to capturing the image of the driver, the second angle of view being directed to capturing the image including the driver and another occupant out of the plurality of occupants,
wherein, in the case where the collision of the vehicle is predicted or detected,
the switcher is configured to switch the angle of view from the first angle of view to the second angle of view, and the controller is configured to detect behaviors of the driver and the other occupant as the behavior detection process.

4. The occupant monitoring device for a vehicle, according to claim 1, the occupant monitoring device further comprising a memory configured to record the image captured by the imaging device,
wherein the controller is configured to
stop the one or more of the determination processes other than the behavior detection process and perform the behavior detection process in the case where the collision of the vehicle is predicted, and
stop the plurality of determination processes including the behavior detection process and record the captured image on the memory in the case where the collision of the vehicle is detected.

5. The occupant monitoring device for a vehicle, according to claim 2, the occupant monitoring device further comprising a memory configured to record the image captured by the imaging device,
wherein the controller is configured to
stop the one or more of the determination processes other than the behavior detection process and perform the behavior detection process in the case where the collision of the vehicle is predicted, and
stop the plurality of determination processes including the behavior detection process and record the captured image on the memory in the case where the collision of the vehicle is detected.

6. The occupant monitoring device for a vehicle, according to claim 3, the occupant monitoring device further comprising a memory configured to record the image captured by the imaging device,
wherein the controller is configured to
stop the one or more of the determination processes other than the behavior detection process and perform the behavior detection process in the case where the collision of the vehicle is predicted, and
stop the plurality of determination processes including the behavior detection process and record the captured image on the memory in the case where the collision of the vehicle is detected.

7. The occupant monitoring device for a vehicle, according to claim 1, wherein the controller is configured to resume the one or more of the determination processes other than the behavior detection process in a case where, after the collision of the vehicle is predicted, the prediction of the collision is resolved before the collision of the vehicle is actually detected.

8. The occupant monitoring device for a vehicle, according to claim 2, wherein the controller is configured to resume the one or more of the determination processes other than the behavior detection process in a case where, after the collision of the vehicle is predicted, the prediction of the collision is resolved before the collision of the vehicle is actually detected.

9. The occupant monitoring device for a vehicle, according to claim 3, wherein the controller is configured to resume the one or more of the determination processes other than the behavior detection process in a case where, after the collision of the vehicle is predicted, the prediction of the collision is resolved before the collision of the vehicle is actually detected.

10. The occupant monitoring device for a vehicle, according to claim 7, wherein
the plurality of determination processes comprises determination processes of a plurality of safety functions for safety of the occupant and a determination process of a convenience function for convenience of the occupant, the determination processes of the plurality of safety functions including the behavior detection process, and
the controller is configured to, in resuming the one or more of the determination processes other than the behavior detection process, resume the determination processes of the safety functions more preferentially than the determination process of the convenience function.

11. The occupant monitoring device for a vehicle, according to claim 10, wherein
the determination processes of the safety functions include, in addition to the behavior detection process, at least one of looking-aside determination, dozing determination, drowsiness determination, or dead-man determination for a driver, and
the determination process of the convenience function includes at least one of gesture determination, emotion determination, or individual identification.

12. The occupant monitoring device for a vehicle, according to claim 1, the occupant monitoring device further comprising a memory configured to record determination results of the plurality of determination processes performed by the controller,
wherein the controller is configured to, in a case where a predetermined period passes after the collision of the vehicle is detected, resume the one or more of the determination processes other than the behavior detection process and record the determination results on the memory.

13. The occupant monitoring device for a vehicle, according to claim 2, the occupant monitoring device further comprising a memory configured to record determination results of the plurality of determination processes performed by the controller,
wherein the controller is configured to, in a case where a predetermined period passes after the collision of the vehicle is detected, resume the one or more of the determination processes other than the behavior detection process and record the determination results on the memory.

14. The occupant monitoring device for a vehicle, according to claim 3, the occupant monitoring device further comprising a memory configured to record determination results of the plurality of determination processes performed by the controller,
wherein the controller is configured to, in a case where a predetermined period passes after the collision of the vehicle is detected, resume the one or more of the determination processes other than the behavior detection process and record the determination results on the memory.

15. The occupant monitoring device for a vehicle, according to claim 1, wherein the controller is further configured to
perform an update function of updating the determination processes, and,
in the case where the collision of the vehicle is predicted or detected, stop the update function as well as the one or more of the determination processes other than the behavior detection process, and perform the behavior detection process.

16. The occupant monitoring device for a vehicle, according to claim 2, wherein the controller is further configured to perform an update function of updating the determination processes, and, in the case where the collision of the vehicle is predicted or detected, stop the update function as well as the one or more of the determination processes other than the behavior detection process, and perform the behavior detection process.

17. The occupant monitoring device for a vehicle, according to claim 3, wherein the controller is further configured to perform an update function of updating the determination processes, and, in the case where the collision of the vehicle is predicted or detected, stop the update function as well as the one or more of the determination processes other than the behavior detection process, and perform the behavior detection process.

18. An occupant monitoring device for a vehicle, the occupant monitoring device comprising:

circuitry configured to acquire imaging information of an occupant in the vehicle, perform, on a basis of the acquired imaging information, a plurality of determination processes including a behavior detection process of detecting a behavior of the occupant, and, in a case where collision of the vehicle is predicted or detected, stop one or more of the determination processes other than the behavior detection process and perform the behavior detection process.

* * * * *